Aug. 4, 1970     J. J. LONES     3,522,980
OPTICAL SIGHTING SYSTEM
Filed Jan. 21, 1969
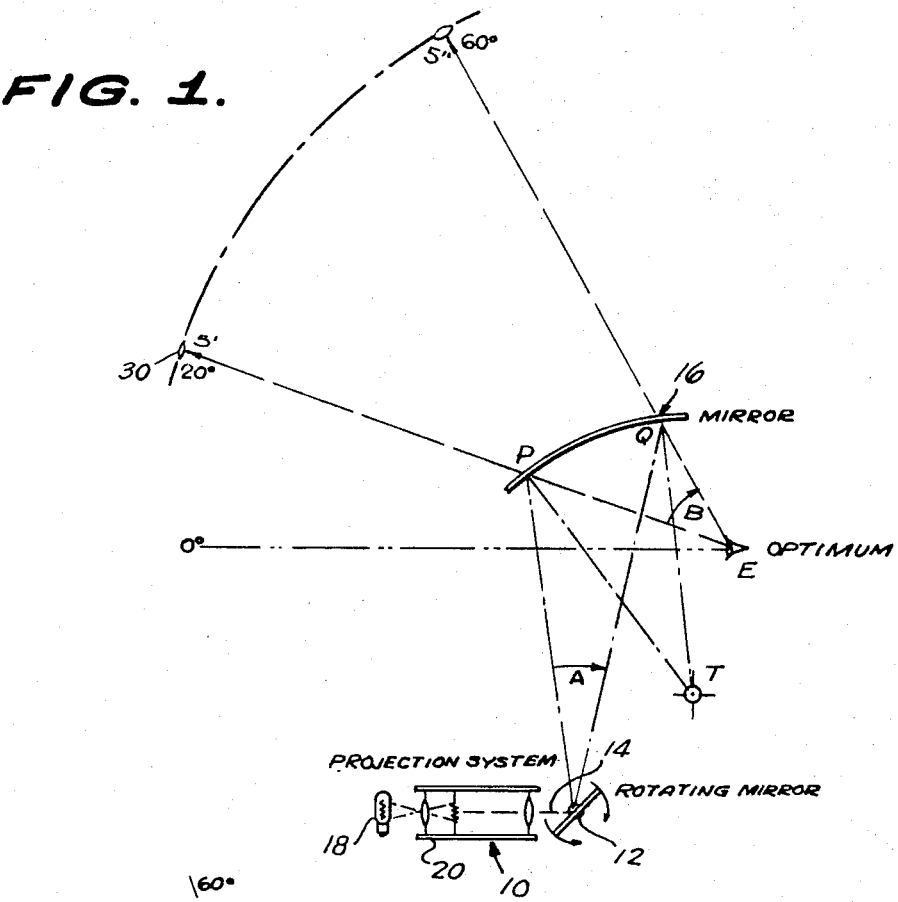
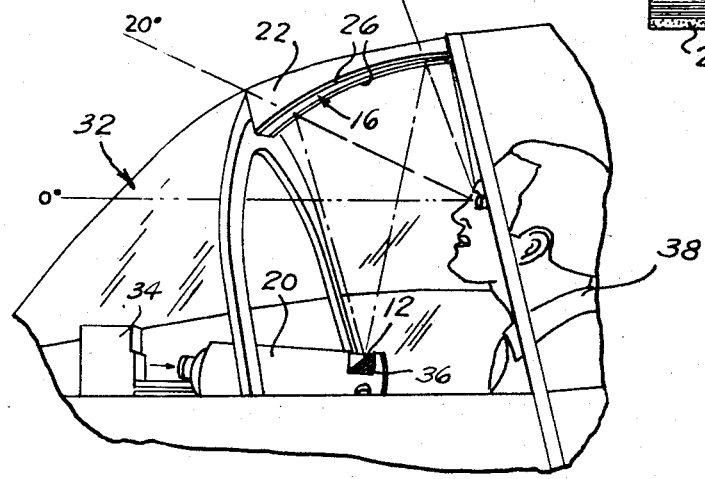
INVENTOR.
JOE J. LONES,
BY
Robert G. McMorrow
ATTORNEY.

United States Patent Office 3,522,980
Patented Aug. 4, 1970

3,522,980
OPTICAL SIGHTING SYSTEM
Joe J. Lones, P.O. Box 6313, San Diego, Calif. 92106
Filed Jan. 21, 1969, Ser. No. 792,331
Int. Cl. G02b 17/00, 27/14
U.S. Cl. 350—6             3 Claims

ABSTRACT OF THE DISCLOSURE

A concave partially reflective mirror carrying strips of diffuse reflecting screen material forming borders which acts in conjunction with a rotating, cylindrically limited, collimated light beam which sweeps the mirror along its length allowing an astigmatized virtual image of the light source to be viewed only at a position which constitutes an extension of a line from the virtual image which passes through the point at which the projected light beam strikes the mirror.

BACKGROUND OF THE INVENTION

Field of the invention

This invention relates to optical sighting systems and more particularly to sighting systems which employ a projected, collimated light beam to define in conjunction with a partially reflective surface, a line of sight which rotates through a given angle.

DESCRIPTION OF THE PRIOR ART

Projected light beams have been employed in the past as the principal component of an optical sighting device, especially for aircraft use in which case, a reflected image of the light source is seen by the pilot or other observer, which image is employed in conjunction with an object, which the observer is sighting, and wherein, deviations between the same indicate movement of the aircraft from the desired line of sight. The known optical sighting systems are complicated, with the apparatus forming the same taking up an unnecessarily large part of the aircraft cockpit and, in some cases, hindering the normal view of the pilot.

SUMMARY OF THE INVENTION

This invention is directed to an optical sighting system which makes use of a concave, partially reflective mirror and a cylindrically limited, collimated light beam which is rotated such that the beam sweeps the length of the partiallly reflective mirror. Narrow strips of diffuse reflecting screen material form borders along both sides of the mirror to define a totally reflected diffuse image of portions of the beam regardless of whether the viewer is in the line of sight. An astigmatized virtual image of the light source is seen only when the observer is at a position which is the extension of a line passing from the virtual image to the point at which the projected beam strikes mirror.

Preferably a collimated, cylindrically limited light is directed onto a mirror which rotates about an axis tilted or parallel to the axis of the concave mirror such that the projected beam is coincident with the sight plane defined by the concave partially reflective mirror. The narrow strips of diffuse reflecting screen material act as edge screens, and extend the complete length of the partially reflective mirror, in planes parallel to the line of sight, such that, unless the observer moves into the line of sight, the observer only sees the reflected beam from the mirror border and fails to see the virtual image of the light source. Any object that is in the field of view through the mirror and located behind the virtual image is then on the line of sight of the observer.

BRIEF DESCRIPTION OF THE DRAWINGS

FIG. 1 is a schematic representation of the optical sighting system of the present invention.

FIG. 2 is a bottom view of the partially reflective mirror forming a principal portion of the optical sighting sysem of FIG. 1.

FIG. 3 is a perspective view of the optical sighting system of the present invention as applied to an aircraft cockpit.

DESCRIPTION OF THE PREFERRED EMBODIMENT

Referring to the drawings, the principal components of the optical system of the present invention are shown in FIG. 1 and comprise an opitcal light beam projector 10, means 12 for rotating the output beam 14 and a specially formed, partially silvered, concave mirror 16.

The projector 10 is constructed under standard optical practice; consisting of a light source 18, collimating means 20 which produces a cylindrically limited, collimated light beam 14 and a rotatable mirror 12 which oscillates about an axis parallel to the axis of the concave mirror 16, in directions indicated by the arrows and through a sweep angle identified at A. With the curved partially reflective mirror fixedly mounted as shown in FIG. 1 and with respect to the optimum eye position E of the observer, rotation of mirror 12 causes the beam of light to form a line of sight which rotates through angle B from line E–P–S′ to line E–Q–S″. Thus the virtual image of the source moves along the path from S′ to S″, as to the projected light beam 14 rotates through angle A in response to rotation of mirror 12 about its axis. The projector is so constructed, and the light source is such, that the narrow beam 14, which is cylindrical in cross-section, is projected at least to a distance beyond the point Q from the projector 10.

An important aspect of the present invention resides in the provision of two borders 26 formed of strips of diffuse reflecting screen material.

In operation, with the projector 10 and the curved mirror 16 positioned as shown in FIG. 1, rotation of the projector beam through the angle A produces rotation, of a line of sight, seen from point E, due to the basic law of reflection as applied to mirror surfaces. The eye of an observer may be easily aligned with the line of sight by first locating the beam portions 28 where they intersect the mriror borders 26 and second by moving the head of the observer until the astigmatized virtual image of the source 30 is seen in the partially reflective mirror 16. Any object that is in the field of view through the mirror and located behind the virtual image 30 is therefore on the line of sight between the observer and the partially reflective mirror. The line of sight is established by the optical system because the virtual image 30 is not visible at any position other than the extension of a line from the virtual image 30 through the point at which the projected beam strikes the mirror (which is indicated by the location of the beam segments 28 at the edges 26 of the mirror). The system is particularly intended for use where a movable line of sight is to be remotely established in one plane from a given "optimum eye position" as at E in the schematic representation of FIG. 1.

In a practical application the optical sighting system of the present invention is shown in a typical aircraft cockpit 32 in which case the light source is housed within a light source casing 34 which directs a beam of light to the collimator 20. The collimator 20 is provided with a rectangular opening 36 such that the pivotable mirror readily directs the collimated beam onto the curved partially reflective mirror 16 which is carried by support means 22 above and to the front of the observer 38 who may, for instance, be the pilot of the aircraft. Suitable arched supporting members 40 and 42 locate the curved mirror and its support means 22 in fixed position with respect to the aircraft cockpit 32. Of course, the longitudinal support means 22 is so provided so as to provide minimum interference with the object in the field of view exterior of the aircraft. The borders in the form of strips 26 may comprise any solid material that gives high percentage diffuse reflection and may consist for instance of that material sold under the trademark Scotchlite.

Any concave element which has a partially reflective surface, with reflective characteristics in the range of 4% and upward, may be substituted for the mirror 16. In experimental work on this invention, the normal reflective qualities of Plexiglas without the application of silvering was found sufficient.

The arrangement shown in FIG. 3 for use in aircraft, may employ a light source, casing the collimator arrangement 34–20 which are such that both the projection and reflection beams are co-planar although it is not necessary that the projection beam be coincident with the vertical line of sight plane, normally centrally of the aircraft cockpit 32. Regardless of coincidence, the operation of the system is identical. Further, the projector and pivotable mirror is not unique to the system and it is only necessary to produce a narrow, cylindrical light beam which may be rotated so as to sweep across the concave mirror surface. This may be achieved by mounting the entire light projector 34 so it pivots or as indicated in the preferred embodiment employs a rotating mirror 12 for this purpose.

What is claimed is:

1. An optical sighting system for visually aligning an object exteriorly of an aircraft with a line of sight internally thereof, said system comprising: a concave partially reflective surface allowing viewing of said exterior object therethrough, a cylindrically limited collimated light source, pivotable reflector means optically aligned with said surface and said light source for producing a virtual image and for causing a collimated light beam to sweep said reflective surface along a portion of its length, and totally reflective border means carried by said reflective surface for allowing the observer to view at all times reflective light from said border means regardless of whether the observer is in the line of sight, while allowing the observer to view reflective light from both side border means and the non border portion of said reflective surface along with said exterior object only when the observer's eye is at a position which is the extension of a line passing from the virtual image to the point at which the projected light beam strikes said reflective surface.

2. The optical sighting system as defined in claim 1 wherein said border means comprises narrow strips of diffuse reflective screen material on either side of said partially reflective concave surface.

3. The sighting system as claimed in claim 1 wherein said pivotable reflector means comprises a mirror pivotable about an axis parallel with respect to the axis of said concave partially reflective surface.

References Cited

UNITED STATES PATENTS

| | | | |
|---|---|---|---|
| 587,443 | 8/1897 | Konig | 350—172 XR |
| 2,715,352 | 8/1955 | Jobe. | |
| 2,992,593 | 7/1961 | Hyde | 350—55 |
| 3,230,819 | 1/1966 | Noxon | 350—27 XR |
| 3,446,916 | 5/1969 | Abel et al. | 350—293 XR |

PAUL R. GILLIAM, Primary Examiner

U.S. Cl. X.R.

350—10, 27, 55, 172